United States Patent [19]

Groenenboom

[11] Patent Number: 5,291,964

[45] Date of Patent: Mar. 8, 1994

[54] APPARATUS FOR AUTOMATICALLY CENTERING A STEERABLE WHEEL

[75] Inventor: Ronald L. Groenenboom, Oskaloosa, Iowa

[73] Assignee: Vermeer Manufacturing Company, Pella, Iowa

[21] Appl. No.: 828,243

[22] Filed: Jan. 30, 1992

[51] Int. Cl.5 .............................................. B62D 5/06
[52] U.S. Cl. .................................. 180/142; 180/140; 280/94
[58] Field of Search ...................... 180/140, 142, 234; 280/94, 98, 99

[56] References Cited

U.S. PATENT DOCUMENTS 3,597,728  8/1971  Kurtz ............................. 280/94 X
4,418,931  12/1983  Howard ............................. 280/94

*Primary Examiner*—David M. Mitchell
*Assistant Examiner*—Andrew C. Pike

*Attorney, Agent, or Firm*—Kent A. Herink; Brian J. Laurenzo; Brett J. Trout

[57] ABSTRACT

An apparatus for centering a steerable wheel or wheels of a ground-travelling machine. The centering apparatus includes an electrically controlled hydraulic steering system for steering of a wheel or wheels which is operable in either a manual or automatic mode. A cam is mounted for pivotal movement in response to the steering direction of the wheel or wheels. A pair of switches are mounted adjacent the cam and are alternately actuated by the cam in response to pivotal movement of the wheel or wheels. When the automatic mode is selected, the corresponding one of the switches will act to control the hydraulic system so as to pivot the wheel or wheels to the centered position. Upon reaching the centered position, the cam will release the actuated switch thereby ceasing steering movement of the wheel or wheels.

3 Claims, 4 Drawing Sheets

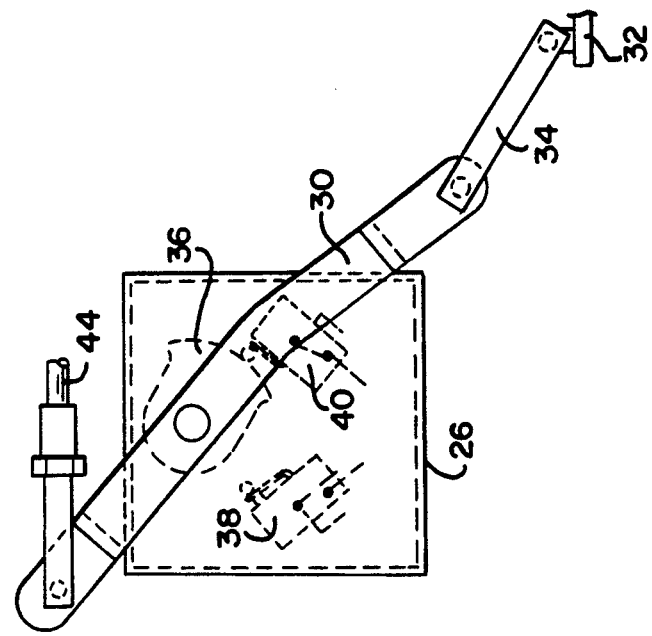
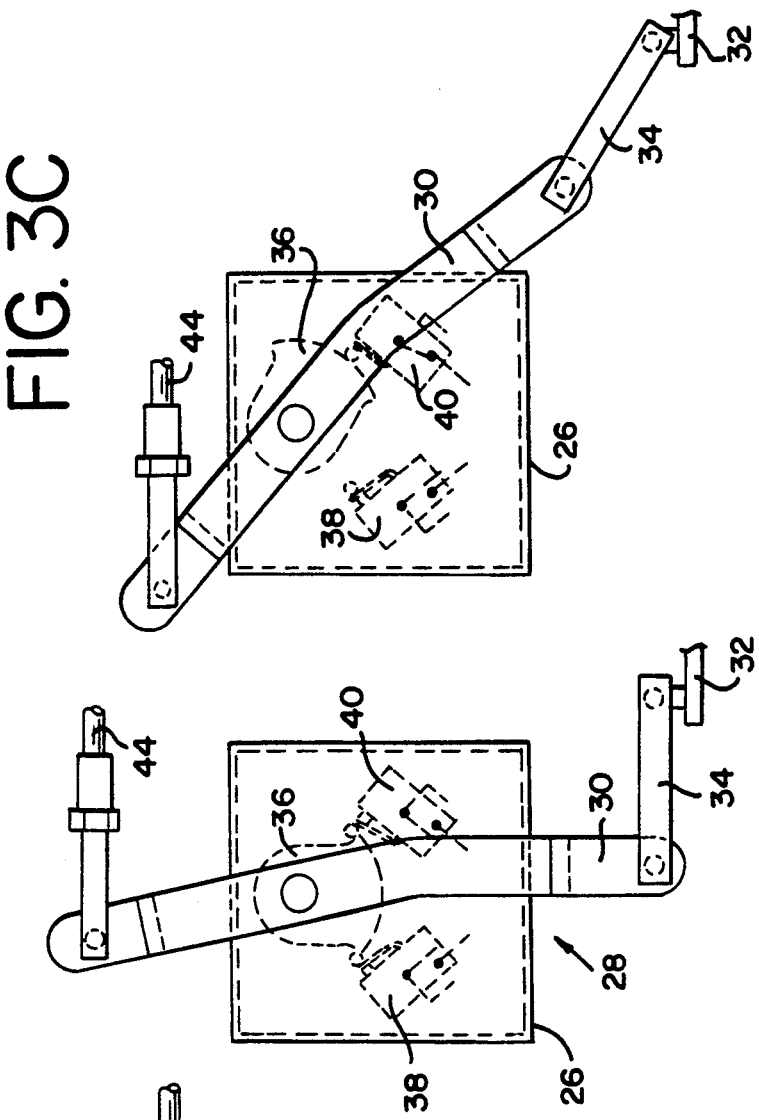
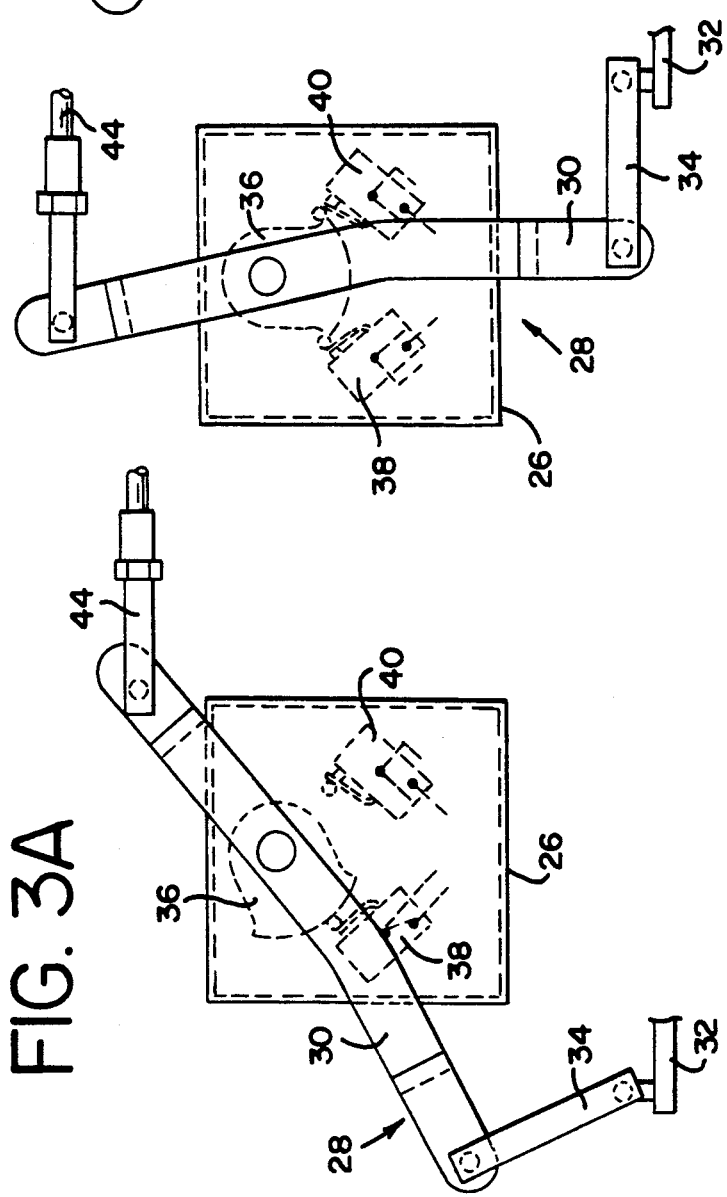

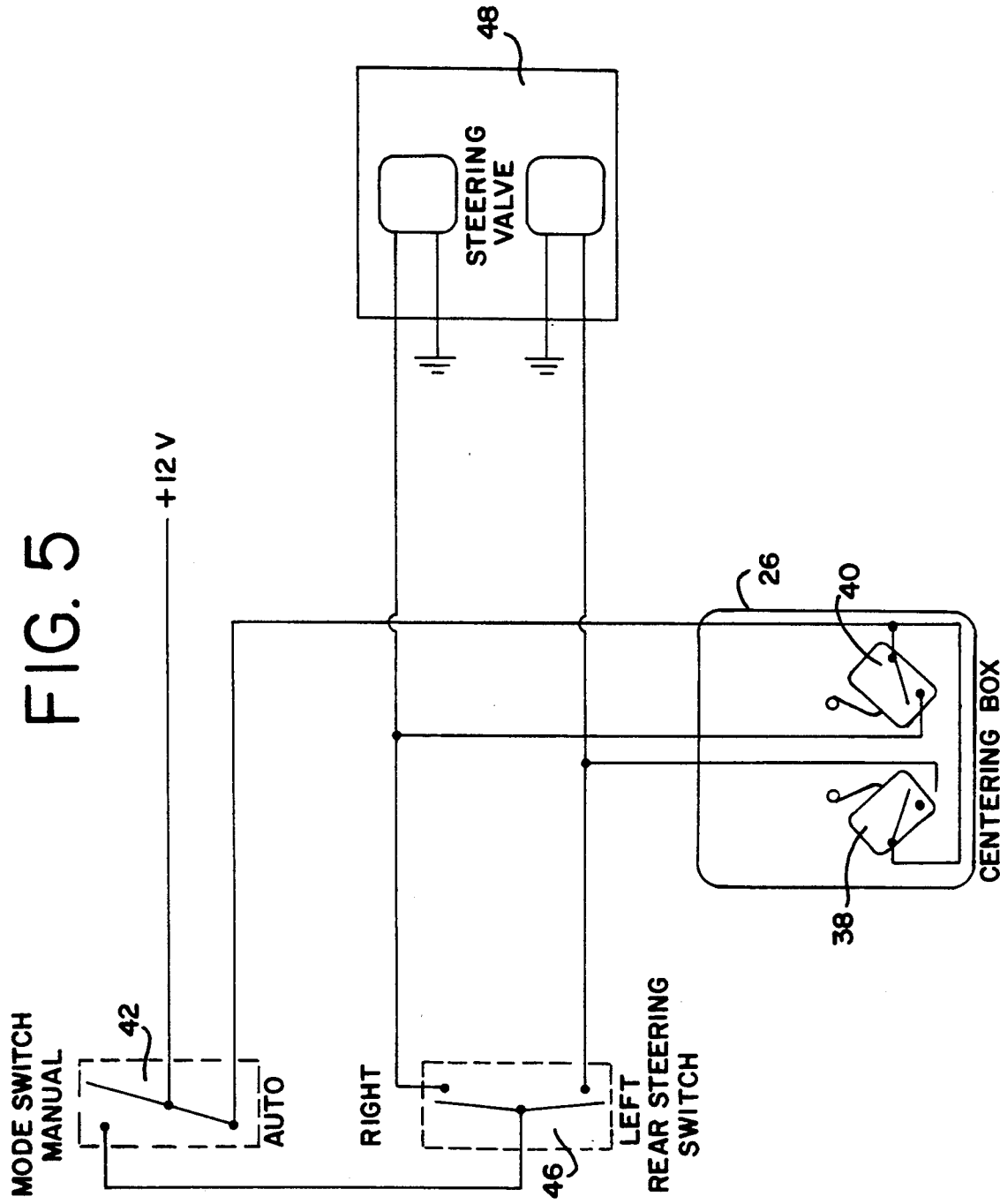

APPARATUS FOR AUTOMATICALLY CENTERING A STEERABLE WHEEL

BACKGROUND OF THE INVENTION

The invention relates generally to ground-travelling machines and, more particularly, to an auto-center steering system for a steerable wheel of a ground-travelling machine which is operable to steer the wheel in alignment with a longitudinal axis of the machine.

Ground-travelling machines having steerable wheels are in common use. One type of such machines are ground-working machines for the creation of narrow ground trenches for a variety of purposes such as the laying of drainage tile, sewer lines, electrical lines, and similar applications. A common ground-working machine includes a four-wheeled tractor unit which supports at a rear end portion thereof an attachment, such as a trenching bar, that is pivotable about a transverse horizontal axis between an upwardly and rearwardly extended transport position and a downwardly and rearwardly extended trenching position. The mobility of the machines is substantially enhanced by providing that both the front and rear wheel or wheels of the tractor unit be independently steerable. The turning radius of the machine is decreased and the machine can be "crab-steered" when, for example, backfilling a trench that was previously dug. It is necessary to accurately return the wheels on-center, however, when the machine is transporting itself between projects or on the roadway. In such circumstances, it is important that the wheels be centered with respect to the machine so that they track accurately in the direction of travel.

Manual wheel or wheel steering systems are known wherein the wheel or wheels are returned to a roughly centered position by an operator who is guided by an indicator linked to a steering member of the steerable wheel or wheels. The mechanical systems are subject to inaccuracy in the centering of the wheel or wheels in that the linkage or other interconnecting device and indicator have a certain amount of hysteresis.

SUMMARY OF THE INVENTION

The invention consists of an adjustable auto-center steering system for returning to center the steerable wheel or wheels of a ground-travelling machine. A cam for operating a pair of electrical steering switches is mounted for pivotal movement in response to the steered position of a wheel or wheels of the machine by a mechanical linkage which interconnects the cam and a steering member of a steerable wheel or wheels. The electrical steering switches control an electrically actuated solenoid valve which is operable to actuate a steering control device that pivots and thereby steers the wheel or wheels. When the system is activated, and the wheel is in an off-center position, the cam will be in a position to actuate a corresponding one of the steering switches which will result in pressurized hydraulic fluid being directed to actuate the steering control device in a direction so as to return the rear wheel or wheels toward the center position. The cam will release the switch and pivotal movement of the wheel or wheels will end when the wheel or wheels have been returned to the centered position. An indicator may also be connected to the cam linkage to provide a visual indication of the steered direction of the wheel or wheels.

An object of the invention is to provide a system for automatically returning a wheel or wheels of a ground-travelling machine to an adjustable on-center position.

Another object of the invention is to provide apparatus for centering a wheel or wheels of a ground-travelling machine that is both accurate and reproducible.

A further object of the invention is to provide apparatus for centering the wheels of a ground-traveling machine which is economical in construction and easy to use.

These and other objects of the invention will be made apparent upon a review of the following specification, drawings, and claims.

BRIEF DESCRIPTION OF THE DRAWINGS

FIGS. 3A-C are enlarged detail side views showing left of center, on-center, and right of center positions of the mechanical linkage and the operation of a pair of switches in response to movement of a cam that is pivoted by the mechanical linkage.

FIG. 5 is a schematic representation of the electrical control circuitry of the present invention.

DETAILED DESCRIPTION OF A PREFERRED EMBODIMENT

Figure 1:
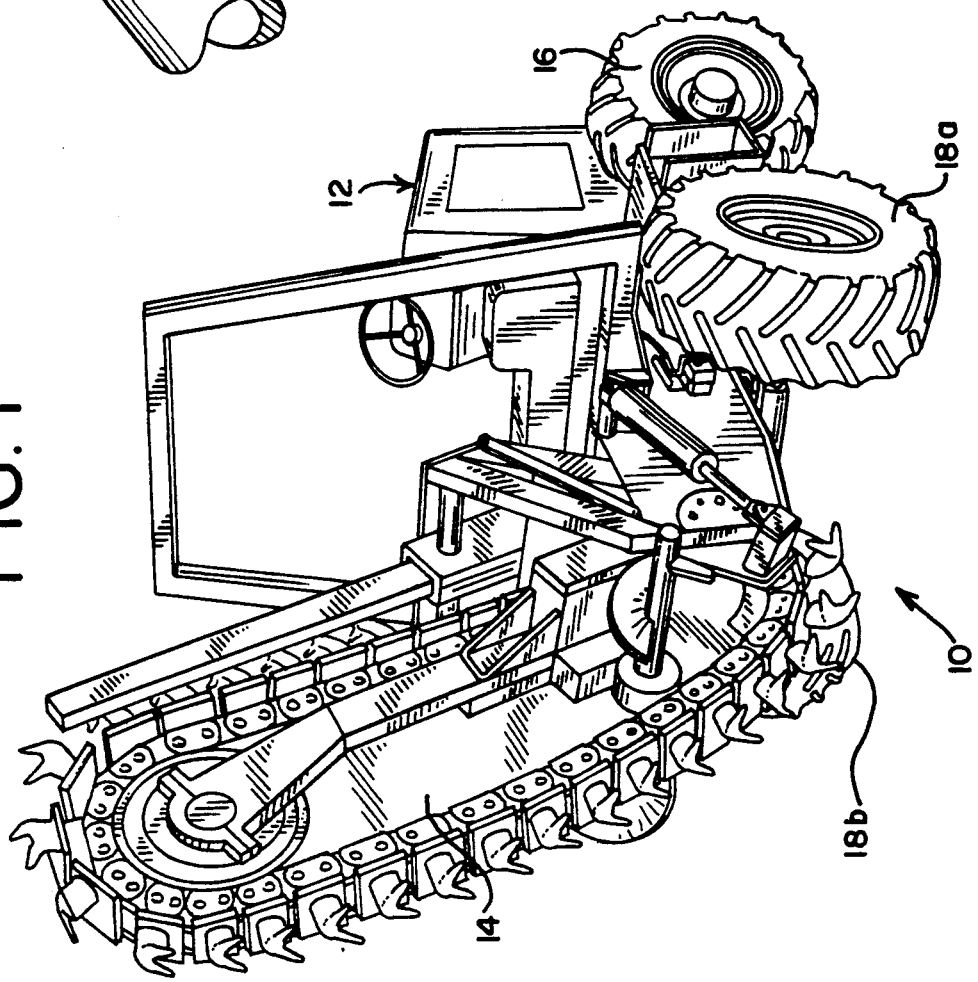
FIG. 1 is a perspective view of a trenching machine having steerable rear wheels and employing the present invention.

Illustrated in FIG. 1, generally at 10, is a ground-travelling trenching machine including a tractor unit 12 at the rear end portion of which is mounted an attachment which, in the preferred embodiment, is a trenching bar 14 illustrated in its upwardly and rearwardly extended transport position. The trenching bar 14 is, in the conventional manner, pivotable about a transverse horizontal axis from the transport position to a downwardly and rearwardly extended operating position for the digging of ground trenches. For increased ease and effectiveness of use, both the front pair of wheels 16 and the rear pair of wheels 18a and 18b are steerable. In the preferred embodiment, the rear wheels 18a and 18b are pivoted or steered by a hydraulic cylinder 20 which is attached to the frame 21 of the tractor unit 12 (FIGS. 1 and 2) The hydraulic cylinder 20 includes an extensible and retractable piston rod 22 which is pivotally attached to a steering knuckle 24 of one of the rear wheels 18a. Accordingly, extension and retraction of the hydraulic cylinder 20 will pivot the rear wheel 18a to the left of center and to the right of center, respectively.

When using the steerable rear wheel feature of the trenching machine 10, an operator will use manual control or switch 46 (FIG. 5) to operate an electrically controlled solenoid valve 48 that will direct pressurized hydraulic fluid from a hydraulic system of the trenching machine 10 to extend or retract the hydraulic cylinder 20 in the desired direction. The manual switch 46 can also be used, of course, as in prior art machines to pivot the rear wheels toward an on-center position.

Figure 2:
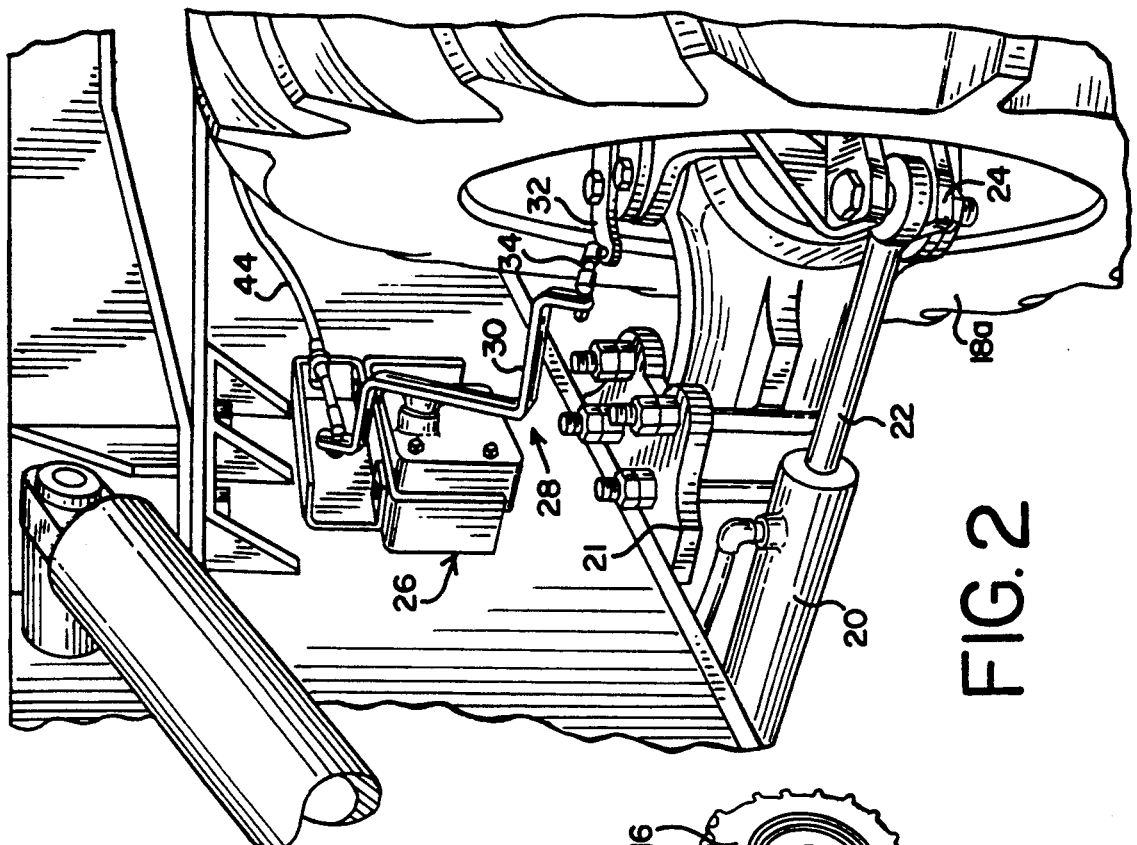
FIG. 2 is a perspective view of the area near the right side rear wheel of the trenching machine of FIG. 1 and showing a mechanical linkage of the present invention.

In the preferred embodiment, a control box 26 is mounted on the frame 21 adjacent the rear wheel 18a. A mechanical linkage, indicated generally at 28 in FIG. 2, is mounted to the control box 26 for pivotal movement about a transverse horizontal axis in response to pivotal movement of the rear wheel 18a. The mechanical linkage 28 includes a main arm 30 and an ear member 32 that is secured to a top portion of the steering knuckle 24. The main arm 30 and ear member 32 are pivotally interconnected by an intermediate linkage arm 34. As the rear wheel 18a is steered or pivoted, ear member 32 will be correspondingly pivoted about the vertical axis of the steering knuckle 24. By way of the intermediate linkage arm 34, the main arm 30 will also be pivoted about its transverse horizontal axis.

As best illustrated in FIGS. 3A-C, a cam 36 is mounted inside the control box 26 for pivotal movement by the main arm 30. A pair of switches, used in a normally open application, left steer switch 38 and right steer switch 40, are mounted inside the control box 26 in actuating proximity to the cam 36.

When the rear wheel 18a is pivoted to the left of center, the main arm 30 will be pivoted in the clockwise direction corresponding to FIG. 3A. The cam 36 will operate to close the left steering switch 38 while the right steering switch 40 remains in the open position. If the rear wheel 18a is instead steered or pivoted to the right of center, the main arm 30 will be pivoted in the counterclockwise direction corresponding to FIG. 3C. The cam 36, accordingly, will close right steering switch 40 and left steering switch 38 will remain open. When the rear wheel 18a is on center, corresponding to FIG. 3B, the cam 36 will be centered relative to the switches 38 and 40 so that both remain open.

Figure 4A:
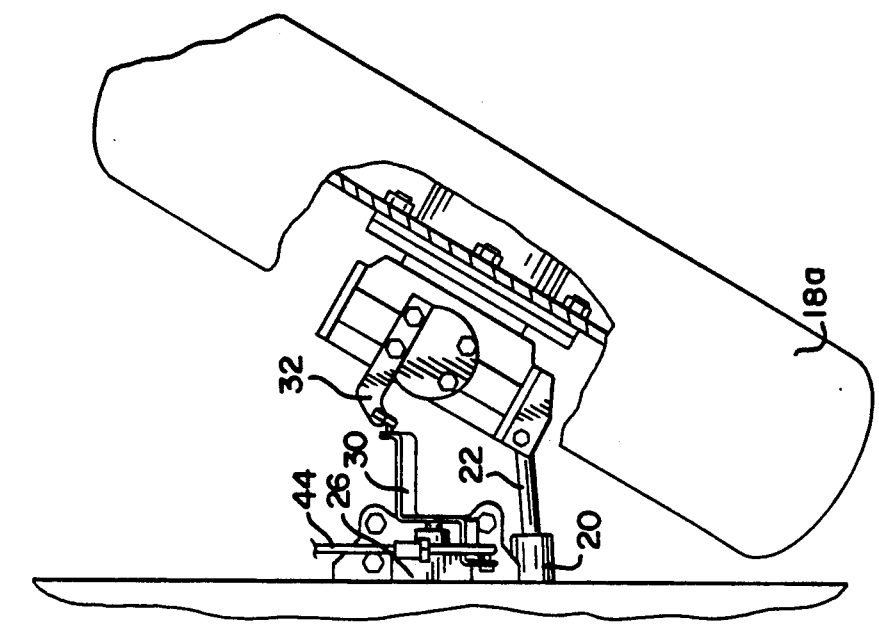
FIGS. 4A-C are upper detail plan views of the right rear wheel of the trenching machine shown in the pivoted positions corresponding to FIGS. 3A-C, respectively.
Figure 4B:
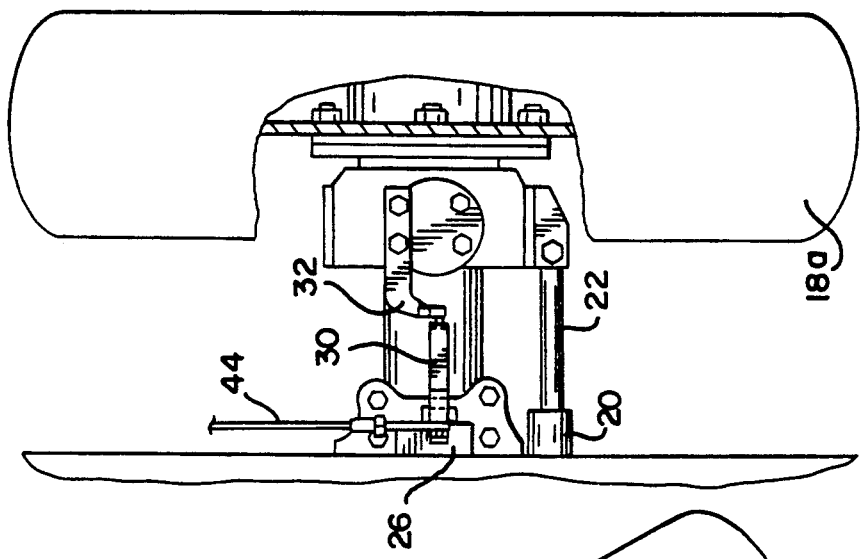

As illustrated in FIG. 5, a mode switch 42 is used to select between the manual and automatic modes of the rear wheel steering system. In the manual mode, as discussed above, the manual rear steering switch 46 is selectively operated to actuate the electrically actuated solenoid steering valve 48 which in turn will extend or retract the steering hydraulic cylinder 20 to pivot or steer the rear wheels 18a and 18b in the selected direction (FIGS. 1 and 5). If the automatic mode is selected on mode switch 42, the steering valve 48 will be controlled by the left and right steering switches 38 and 40. When the rear wheel 18a is to the left of center (FIGS. 3A and 4A), the closure of left steering switch 38 will result in hydraulic fluid being directed to retract the hydraulic cylinder 20 which will move the rear wheel 18a toward the centered position and will also pivot the main arm 30 and cam 36 in the counterclockwise direction. The left steer switch 38 will remain in the closed condition until the cam 36 has been pivoted to the center position as illustrated in FIG. 3B which is also the centered position of the wheel 18a as illustrated in FIG. 4B.

Figure 4C:
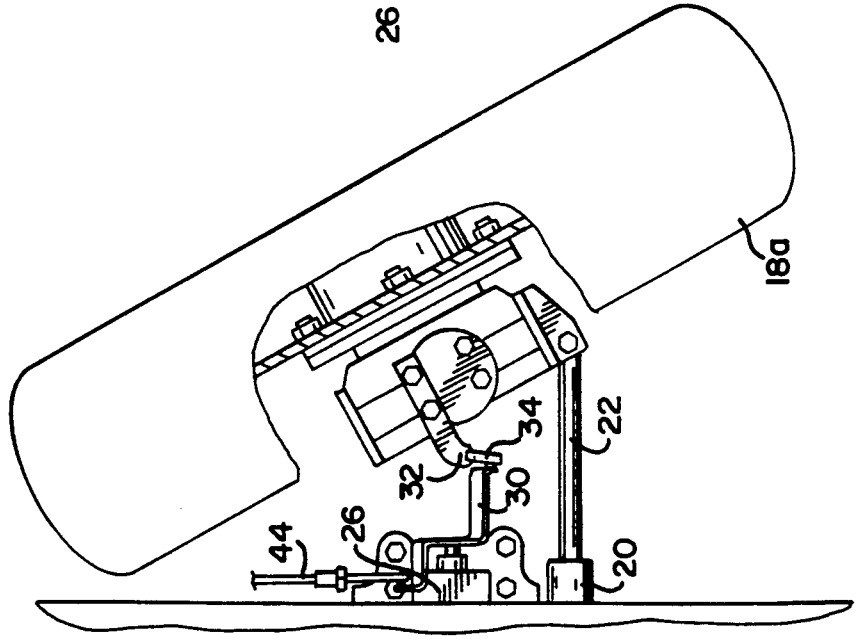

Similarly, when the rear wheel 18a is pivoted to the right of center (FIG. 4C), the main arm 30 and cam 36 (FIG. 3C) will be pivoted in the counterclockwise direction so as to close right steer switch 40. Closure of switch 40 while the left steer switch 38 is open will result in hydraulic fluid being directed by the steering valve to extend the cylinder 20 and thereby pivot the rear wheel 18a toward its centered position. The mechanical linkage 28 will correspondingly pivot the main arm 30 and cam 36 in the clockwise direction until the right steer switch 40 is allowed to return to its open position as illustrated in FIG. 3B As above, this corresponds to the centered position of the wheel 18a as illustrated in FIG. 4B.

A cable 44 for a mechanical indicator is connected to the main arm 30 (FIG. 2) to provide a visual indication of the direction of the rear wheels to an operator of the trenching machine.

While the invention has been described with respect to a preferred embodiment wherein it is used to steer a pair of rear wheels, the invention could also be used to steer a single wheel or a three-wheeled machine or the front wheels of a machine, such as a forklift or other machine wherein the rear pair of wheels are the normally steered wheels.

Although the invention has been described with respect to a preferred embodiment thereof, it is to be also understood that it is not to be so limited since changes and modifications can be made therein which are within the full intended scope of this invention as defined by the appended claims.

I claim:

1. Apparatus for centering one or more steerable wheels of a ground-traveling machine in alignment with a longitudinal axis of the machine, the centering apparatus comprising:
   (a) means for steering the wheels;
   (b) means for sensing the position of the wheels wherein said sensing means includes a cam mounted for pivotal movement in response to said steering of the wheels, and wherein said sensing means includes a first switch operable by said cam when the wheels are steered to a first side of a center position and a second switch operable by said cam when the wheels are steered to a second side of said center position;
   (c) switch means for energizing said sensing means; and
   (d) means for operating said steering means in response to said sensing means upon engagement of said switch means to move the wheels to said center position.

2. Apparatus for centering one or more steerable wheels of a ground-traveling machine in alignment with a longitudinal axis of the machine, the centering apparatus comprising:
   (a) means for steering the wheels wherein said steering means includes a steering control device;
   (b) means for sensing the position of the wheels;
   (c) switch means for energizing said sensing means; and
   (d) means for operating said steering means in response to said sensing means upon engagement of said switch means to move the wheels to a center position, wherein said operating means includes an electrically controlled hydraulic valve interconnected to said steering control device.

3. Apparatus as defined in claim 2, wherein said steering control device includes a hydraulic actuator.

* * * * *